United States Patent [19]

Conner et al.

[11] Patent Number: 5,176,794

[45] Date of Patent: * Jan. 5, 1993

[54] FLAME SPREAD BARRIER MADE FROM MECHANICALLY DELAMINATED VERMICULITE SHEET

[75] Inventors: Herbert T. Conner, Landenberg, Pa.; David H. Dumas, Hong Kong, Hong Kong; Lawrence L. Nelson, Wilmington, Del.

[73] Assignee: Hercules Incorporated, Wilmington, Del.

[*] Notice: The portion of the term of this patent subsequent to Aug. 18, 2009 has been disclaimed.

[21] Appl. No.: 696,820

[22] Filed: May 7, 1991

Related U.S. Application Data

[63] Continuation-in-part of Ser. No. 290,739, Dec. 28, 1988, Pat. No. 5,139,615.

[51] Int. Cl.⁵ ............................................. D21H 13/44
[52] U.S. Cl. .................................... 162/123; 162/128; 162/129; 162/145; 162/152; 162/164.1; 162/168.1; 162/181.6; 162/183
[58] Field of Search ............ 162/181.6, 145, 152, 162/128, 125, 129, 164.1, 183, 168.1, 168.2; 428/241, 324, 363, 283; 106/415, 417, 482, 484

[56] References Cited

U.S. PATENT DOCUMENTS

| | | | |
|---|---|---|---|
| 3,434,917 | 3/1966 | Kraus et al. | 162/3 |
| 3,466,222 | 9/1969 | Curtis | 161/160 |
| 3,779,860 | 9/1985 | Oshida | 106/18.12 |
| 3,934,066 | 1/1976 | Murch | 428/248 |
| 4,271,228 | 6/1981 | Foster et al. | 428/281 |
| 4,442,164 | 4/1984 | Briggs et al. | 428/283 |
| 4,472,478 | 9/1984 | Briggs et al. | 428/283 |
| 4,532,176 | 7/1985 | Briggs et al. | 428/288 |
| 4,543,287 | 9/1985 | Briggs et al. | 428/288 |
| 4,678,700 | 7/1987 | McAloon et al. | 428/198 |
| 4,801,403 | 1/1989 | Lu et al. | 252/378 |
| 4,888,233 | 12/1989 | Brew | 428/220 |

FOREIGN PATENT DOCUMENTS 2185438 7/1987 United Kingdom .

Primary Examiner—Peter Chin
Attorney, Agent, or Firm—Joanne W. Patterson

[57] ABSTRACT

One or more layers of a sheet comprising (1) 60% to 99%, based on the weight of solids, of vermiculite delaminated by mechanical means only, (2) 1% to 40%, based on the weight of solids, of at least one fibrous material and (3) 0.1% to 4%, based on the weight of the vermiculite, of at least one flocculating agent, can be used to protect heat-sensitive substrates such as resin matrix composites from fire or heat.

19 Claims, No Drawings

FLAME SPREAD BARRIER MADE FROM MECHANICALLY DELAMINATED VERMICULITE SHEET

This application is a continuation-in-part of application Ser. No. 07/290,739 filed Dec. 28, 1988 now U.S. Pat. No. 5,139,615.

FIELD OF THE INVENTION

This invention relates to flame spread barriers for heat-sensitive substrates.

BACKGROUND OF THE INVENTION

Resin matrix composites such as carbon fiber-reinforced epoxy resin composites and glass fiber-reinforced polyester resin composites are useful in applications where a high strength and stiffness to weight ratio are required. However, the composites exhibit poor fire resistance because of their high degree of flammability, rapid flame spread, high rate of heat release and, in some cases, production of toxic combustion gases. Many solutions have been proposed for improving the fire resistance of composites and other heat-sensitive substrates, for example, addition of halogenated materials to the resin; addition of aluminum trihydrate, borate salts or polyammonium phosphates to the resin; application of intumescent coatings to the substrate; and use of thick inorganic fiber mats as insulation. All of these materials have disadvantages, however, such as generation of toxic and corrosive halogenated gases, deterioration in the physical properties of the substrate, the necessity for several time-consuming and labor intensive coating applications, and low abrasion resistance of the protective material.

Vermiculite in various forms has been used for fire protection of heat-sensitive substrates. For example, U.S. Pat. Nos. 4,442,164 and 4,543,287 disclose the use of a composite of fibers coated with chemically delaminated vermiculite for the fire protection of substrates. U.S. Pat. No. 4,888,233 discloses coating a substrate with a composition comprising chemically delaminated vermiculite and a copolymer of ethylene and a vinyl monomer to impart fire and heat resistance. U.S. Pat. No. 4,678,700 discloses the use of carbon fibers coated with chemically delaminated vermiculite to insulate substrates and protect them from fire.

SUMMARY OF THE INVENTION

It has now been found that a sheet made from a mixture of fibers and mechanically delaminated vermiculite can be used to protect a heat-sensitive substrate such as a resin matrix composite from fire and/or heat. The structure of this invention comprises a heat-sensitive substrate and a vermiculite-filled fibrous sheet comprising (1) from about 60 to about 99%, based on the weight of solids, of mechanically delaminated vermiculite, (2) from 1% to about 40%, based on the weight of solids, of at least one fibrous material, and (3) from 0.1% to about 4%, based on the weight of the vermiculite, of at least one flocculating agent.

Use of one or more layers of the sheet material of this invention to protect a heat-sensitive substrate significantly reduces flame spread, heat release and smoke generation without compromising the physical properties of the substrate.

DETAILED DESCRIPTION OF THE INVENTION

The term "vermiculite" used in this specification refers to all materials known mineralogically or commercially as vermiculite, and includes minerals consisting wholly or largely of vermiculite, including minerals of a mixed-layer type (phyllosilicates) that contain vermiculite layers as a constituent (such as hydrobiotite and chlorite vermiculite) and that can be delaminated in the same manner as vermiculite.

The vermiculite ore particles are delaminated by subjecting an aqueous slurry of the ore to a shearing force to produce a dispersion containing vermiculite lamellae, using any suitable shearing device known in the art, such as, for example, a cowles blade, roller mill, colloid mill, or ball type mill. The shearing force can also be imparted by suitable vibratory treatment, for example, ultrasonic agitation of the aqueous ore slurry. Vermiculite that is delaminated by dry milling the raw ore can also be used, but wet ground ore is preferred. The vermiculite ore is not treated with heat or with a chemical swelling agent (exfoliant) to expand the vermiculite.

Aqueous slurries of unexpanded vermiculite ore that are subjected to shearing in accordance with this invention preferably comprise from about 10% to about 50% by weight solids, the preferred range being from about 10% to about 35% by weight, and most preferably from about 20% to about 35% by weight. The weight percent solids content of the slurries is limited by such factors as the slurry viscosity, the means of shearing action employed, and the viscosity of the resulting dispersion of vermiculite lamellae.

Vermiculite lamellae have a particle size typically less than 200 microns, preferably less than 53 microns. Such particles generally have an aspect ratio, i.e., length or breadth divided by thickness, of at least 10. Shearing should be applied for the minimum time necessary to achieve a dispersion containing particles of the preferred dimensions. If desired, particles that are undesirable, for example, particles larger than 53 microns, can be removed by any conventional physical separation method after shearing. These separation methods include, but are not limited to, sedimentation, filtration, sieving, centrifuging and cyclone separation.

A dispersant that does not swell the vermiculite or a combination of such dispersants can be added to the aqueous slurry of vermiculite before, during or after shearing, or a combination thereof. Slurries can be sheared at a higher solids content by adding a dispersant. The dispersant decreases the viscosity of such slurries without exfoliating (swelling) the vermiculite lamellae. Both inorganic and organic compounds can be used as the dispersants, for example, alkali metal salts of polyphosphates such as tetrasodium pyrophosphate, and derivatives of polyamines such as polyethyleneimines. A list of other suitable dispersants can be found in U.S. Pat. No. 4,801,403.

The amount of dispersant necessary to control the viscosity of the aqueous slurry of vermiculite or of the dispersion of vermiculite lamellae resulting from shearing the slurry depends upon process variables such as temperature, slurry or dispersion pH, extent of conversion of slurried vermiculite ore to vermiculite lamellae, the shearing device employed, and the solids level of the vermiculite aqueous slurry or dispersion.

After the delamination step, from about 60% to about 99%, preferably from about 80% to about 94%, of the mechanically delaminated vermiculite and from 1% to about 40%, preferably from 6% to about 20%, of one or more fibrous materials, based on the weight of solids, are dispersed in water. The fibrous material can be one or more types of organic or inorganic fibers or mixtures thereof. Suitable inorganic fibers include, for example, fibers made from silicon, boron, ceramic, glass, metal and mineral fibers. Suitable organic fibers include, for example, cellulosic fibers such as pulped newsprint, Kraft paper pulp and bagasse; polyester; polyamide; polyolefin; polyimide; polyacrylate; carbon; polyamide-imide; polyether-imide and phenolic fibers. The type of fiber selected will depend upon the use for which the final product is intended.

Additives such as wet and dry strength agents, sizing agents, binders, adhesives, fire retardants and other additives known to the papermaking art can also be present in the dispersion.

A flocculating agent, or a combination of flocculating agents, is added to the dispersion of vermiculite and fibers in an amout of from 0.1% to about 4%, based on the weight of the vermiculite, to flocculate the dispersion. The flocculating agent can be selected from any of those known in the papermaking art. Such flocculants include, but are not limited to, mineral acids, monovalent bases such as potassium hydroxide, organic acids, inorganic anions such as phosphates and sulfates, high molecular weight cationic polyelectrolytes and high molecular weight anionic polymers. A combination of an anionic acrylamide copolymer and a cationic polyamine is preferred. The flocculating agent is retained in the finished sheet.

The flocculated dispersion is deposited on conventional papermaking screens and dewatered to form a sheet. A continuous dewatering process can be used to form a product in roll form. After dewatering, the sheet is dried by any suitable method known in the art.

The first pass retention of the vermiculite in the sheet is generally greater than 50%, preferably greater than 80%. Such sheets can be in the form of paper, typically 5 to 30 mils thick, or paperboard, typically 1/16 to 1/2 inch thick. If desired, the sheet or board can be shaped prior to drying to produce three dimensional structures by techniques known in the art, for example, corrugation.

The vermiculite-filled fibrous sheets of this invention can be used to protect a wide variety of heat-sensitive substrates, including resin matrix composites, from the effects of fire and heat. The resins used in the composites typically include thermosets such as, for example, epoxies, bismaleimides, unsaturated polyesters, melamine/formaldehyde, phenolics, furans, silicones, cyanurate esters and acrylates, as well as amorphous and crystalline thermoplastics such as polysulfones, polyethersulfones, polyimides, polyethers, polyetherketones and polyacrylates. Reinforcing fibers such as glass, aramid, ceramic, mineral, boron, carbon, graphite or polymeric materials are typically used in such composites. The composites may also comprise polymeric interpenetrating networks that do not require fibers for reinforcement. Other types of fillers as well as common flame retardants for polymers, e.g., aluminum trihydrate or polyammonium phosphate, can be included.

The structures of this invention comprising one or more layers of a mechanically delaminated vermiculite-filled fibrous sheet and a heat-sensitive substrate can be fabricated by any of a number of procedures known in the art. For example, a resin-impregnated fiber tape, tow or roll can be layered in a mold with the vermiculite-filled fibrous sheet followed by compressing the assembly and curing the resin. Alternatively, a resin-impregnated fiber tape can be cured and the vermiculite-filled fibrous sheet can be applied in a separate step by compressing it into the resin matrix. When a thermoplastic resin is used as the matrix of the composite, press molding can be used. The vermiculite-filled fibrous sheet can also be applied to the substrate by means of an adhesive or simple fasteners such as staples and tacks.

A decorative layer such as one having a wood grain, floral or embossed pattern can be applied over the vermiculite-filled fibrous sheet. To minimize scratching, the decorative layer can be covered with an abrasion resistant film such as TEDLAR ® polyvinyl fluoride film, manufactured by Du Pont. Additional layers such as intumescent materials, insulating materials such as glass mats, or ceramic coatings can be positioned between the vermiculite/fiber sheet and the substrate.

The vermiculite-filled fibrous sheets of this invention can be used to protect heat or fire sensitive substrates other than resin matrix composites, for example, wood, polymer film or foam, particle board, mineral board or steel. If desired, the substrate can be in the form of a honeycomb composite structure such as a NOMEX phenolic honeycomb core manufactured by Du Pont. In some cases the vermiculite-filled fibrous sheet does not have to be attached to the substrate to be protected, e.g., there can be an air space between the vermiculite-filled fibrous sheet and the substrate.

EXAMPLE A

Mechanically delaminated vermiculite is prepared by shearing a mixture of Grade 4 vermiculite ore at 36% by weight in water for two hours on a six inch colloid mill equipped with CARBORUNDUM ™ stones followed by sieving to remove particles greater than fifty-three microns. The vermiculite dispersion is then combined with type S691 glass fibers (7.5 microns in diameter, ⅛" in length) supplied by Owens-Corning Fiberglass Corp., and unbleached kraft pulp that has been refined to 250 Canadian Standard Freeness. The ratio of vermiculite/glass/wood pulp is 88/6/6 based on the weight of the vermiculite.

Water is added to reduce the solids of the dispersion to 0.5 wt %. KYMENE ® 557H cationic resin (Hercules Incorporated) and RETEN ® 523P anionic acrylamide copolymer (Hercules Incorporated) are used as the flocculants and are delivered at the first mixbox and fan pump, respectively, of a flat wire Fourdrinier paper machine. The level of flocculant is 2.5% and 1.2% respectively, based on the weight of vermiculite. The vermiculite-filled fibrous sheet, which is referred to as VICS in the following tables, has a basis weight (BW) of 230–250 lb/3000 ft$^2$ and a thickness of 17–19 mils, depending on the wire speed.

EXAMPLE 1

A vermiculite-filled fibrous sheet prepared as described in Example A is applied to a variety of thermoset resin matrix composites currently being used in transportation, aerospace, and military applications. The VICS sheet is applied to the resin matrix composite using a two part, room temperature epoxy adhesive, (MARINE-TEX ®, Travaco Laboratories, Inc.), except in the case of the silicone composite where a silicone adhesive is used. The resin matrix composites were purchased from Franklin Fiber-Lamitex Corp., Wilmington, Del. Panel types in Table I are indicated by the trade designations GPO-1, G-3, etc.

The ability of the vermiculite-filled fibrous sheets to reduce the flame spread of a resin matrix composite is determined according to ASTM D 3807-79 in an inclined two foot tunnel at a gas flow of 6.2 SCFH (12 inch flame) instead of the standard of 2.0 SCFH (8 inch flame). Flame spread measurements are made every fifteen seconds for a total burn time of four minutes. Measurements are made on the unprotected control, as well as on composites protected with the VICS sheets. Total flame spread is defined as the area under the curve in a plot of flame spread in inches vs burn time in minutes. The symbol ">" in front of the total flame spread measurement indicates that the flame went beyond the end of the tunnel. The extent of damage to the composite was assessed by comparing the weight loss of the protected composite to that of the unprotected control. The results of the measurements are given in Table I. The data demonstrate that the VICS sheets of this invention act as a thermal insulator and reduce the thermal damage to the resin matrix composite.

TABLE I

Two Foot Flame Tunnel Flame Spread Performance Using a Modified ASTM-D-3807-79[a] Method

| Thermoset Composite | Total Flame Spread (inches) | | Wt. Loss (grams) | |
|---|---|---|---|---|
| | As Received | Protected | As Received | Protected |
| G-3 Phenolic | >67 | >74 | 9.2 | 9.0 |
| G-7 Silicone | >126 | >117 | 1.6 | 2.8[b] |
| FR-4 Epoxy | >169 | >177 | 31.1 | 23.5 |
| GPO-1 Polyester | >171 | >145 | 20.0 | 16.4 |
| GPO-3 Polyester | >177 | >175 | 20.3 | 17.0 |

[a] Tunnel Conditions: 12 inch flame, heat flow of 16 KBTU hr
[b] Increased weight loss due to adhesive burn-out

EXAMPLE 2

One, two or four VICS sheets prepared as described in Example A are applied to a G-10 epoxy/glass resin matrix composite and a GPO-3 polyester/glass composite using a two part, room temperature epoxy adhesive (MARINE-TEX ®, Travaco Laboratories, Inc.). When more than one VICS sheet is used, the sheets are adhered to each other using Elmers GLU ALL polyvinyl acetate adhesive at approximately 0.01 g/in$^2$. The resin matrix composites were purchased from Franklin Fibre-Lamitex Corp., Wilmington, Del. Total flame spread and % weight loss are determined as described in Example 1. The results are given in Table II. The data show a synergistic improvement in flame spread reduction, weight loss and char index with two or four layers of VICS. The char index is a measurement of the maximum width, depth and length of the charred area over the burner.

TABLE II

Two Foot Flame Tunnel Flame Spread Performance Using Multiple VICS Layers (Modified D-3807-79[a] Method)

| | Total Flame Spread (in) | Wt Loss (g) | Char Index (cm$^3$) |
|---|---|---|---|
| G-10 Epoxy/glass composite | | | |
| Control | >187 | 32.8 | 99[b] |
| 1 Layer VICS | 202 | 27.5 | 72 |
| 2 Layers VICS | 149 | 13.5 | 46 |
| 4 Layers VICS | 22 | 8.4 | 37 |

TABLE II-continued

Two Foot Flame Tunnel Flame Spread Performance Using Multiple VICS Layers (Modified D-3807-79[a] Method)

| | Total Flame Spread (in) | Wt Loss (g) | Char Index (cm$^3$) |
|---|---|---|---|
| GPO-3 Polyester/glass composite | | | |
| Control | >191 | 17.1 | 49.5 |
| 1 Layer VICS | 159 | 13.5 | 35 |
| 2 Layers VICS | 10 | 8.7 | 9.6 |
| 4 Layers VICS | 3 | 4.3 | 1.2 |

[a] 10" Flame (10,000 BTU hr) used unless otherwise noted
[b] 12" Flame

We claim:

1. A structure comprising a heat-sensitive substrate and a vermiculite-filled fibrous sheet comprising (1) from about 60% to about 99%, based on the weight of solids, of vermiculite delaminated by mechanical means only and having a particle size of less than 200 microns, (2) from 1% to about 40%, based on the weight of solids, of at least one fibrous material and (3) from 0.1% to about 4%, based on the weight of the vermiculite, of a combination of a cationic and an anionic flocculant.

2. The structure of claim 1 wherein the sheet comprises from about 80% to about 94%, based on the weight of solids, of vermiculite delaminated by mechanical means only and having a particle size of less than 200 microns, from 6% to about 20%, based on the weight of solids, of at least one fibrous material, and from 0.1% to about 4%, based on the weight of vermiculite, of a combination of a cationic and an anionic flocculant.

3. The structure of claim 1 wherein the mechanically delaminated vermiculite is prepared by wet milling of vermiculite ore.

4. The structure of claim 1 wherein the mechanically delaminated vermiculite has a particle size of less than 53 microns.

5. The structure of claim 1, wherein the sheet is made by conventional papermaking or paperboard-making methods.

6. The structure of claim 1 wherein the substrate is a resin matrix composite.

7. The structure of claim 6 wherein the resin in the composite is a thermoset resin.

8. The structure of claim 6 wherein the resin in the composite is a thermoplastic resin.

9. The structure of claim 1 wherein multiple layers of the vermiculite-filled fibrous sheet are used.

10. The structure of claim 1 wherein the fibrous material is a combination of glass fibers and wood pulp.

11. The structure of claim 1 which also comprises an additional layer positioned between the substrate and the vermiculite-filled fibrous sheet.

12. A process for protecting a heat-sensitive substrate from fire and/or heat comprising positioning a vermiculite-filled fibrous sheet adjacent to the substrate, said sheet comprising (1) from about 60% to about 99%, based on the weight of solids, of vermiculite delaminated by mechanical shearing only and having a particle size of less than 200 microns, (2) from 1% to about 40% of at least one fibrous material, based on the weight of solids, and (3) from 0.1% to about 4%, based on the weight of vermiculite, of a combination of a cationic and an anionic flocculant.

13. The process of claim 12 wherein the sheet comprises from about 80% to about 94% vermiculite delaminated by mechanical means only and having a particle size of less than 200 microns, from 6% to about 20%, based on the weight of solids, of at least one fibrous material, and from 0.1% to about 4%, based on the weight of vermiculite, of a combination of a cationic and an anionic flocculant.

14. The process of claim 12 which comprises the additional step of positioning an additional layer between the substrate and the vermiculite-filled fibrous sheet.

15. The process of claim 12 wherein the fibrous material is a combination of glass fibers and wood pulp.

16. The process of claim 12 wherein the substrate is a resin matrix composite.

17. The process of claim 16 wherein the resin in the resin matrix composite is a thermoset resin.

18. The process of claim 16 wherein the resin in the composite is a thermoplastic resin.

19. The process of claim 12 wherein multiple layers of the vermiculite-filled fibrous sheet are used.

* * * * *